No. 875,456. PATENTED DEC. 31, 1907.
P. PRIESS.
CULTIVATOR SHOVEL.
APPLICATION FILED JULY 11, 1907.

Witnesses
L. B. James
C. H. Griesbauer

Inventor
PETER PRIESS
by H. B. Willson & Co.
Attorneys

UNITED STATES PATENT OFFICE.

PETER PRIESS, OF PLEASANT VALLEY, OKLAHOMA.

CULTIVATOR-SHOVEL.

No. 875,456.  Specification of Letters Patent.  Patented Dec. 31, 1907.

Application filed July 11, 1907. Serial No. 383,330.

*To all whom it may concern:*

Be it known that I, PETER PRIESS, a citizen of the United States, residing at Pleasant Valley, in the county of Logan, Oklahoma, have invented certain new and useful Improvements in Cultivator-Shovels; and I do declare the following to be a full, clear, and exact description of the invention, such as will enable others skilled in the art to which it appertains to make and use the same.

This invention has relation to new and useful improvements in cultivator shovels.

The object of the invention is to provide a shovel comprising two separable sections, namely a shank and a point so that the point may be removed from the shank should it become unfit for use because of wear, breakage or the like so that a new point may be substituted therefor and to provide a shank adapted for removable attachment to a standard.

With the foregoing and other objects in view which will appear as the nature of the invention is better understood, the invention consists in certain novel features of construction, combination and arrangement of parts, as will be hereinafter fully described and claimed.

Figure 1:
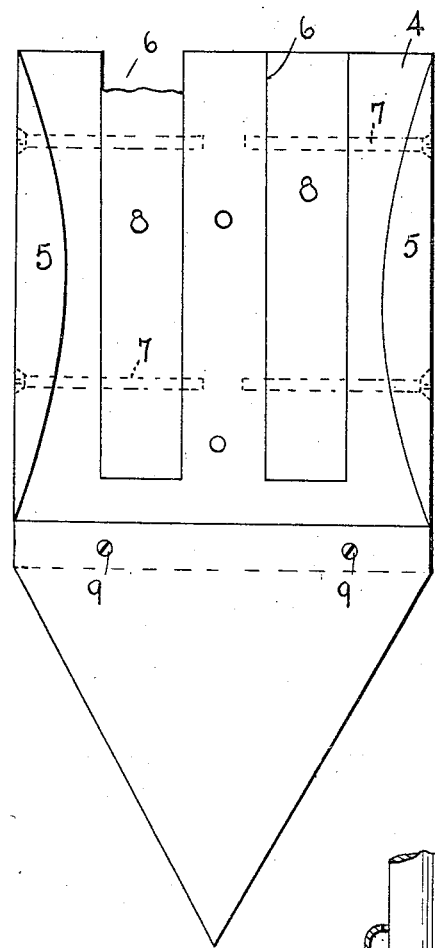
Figure 2:
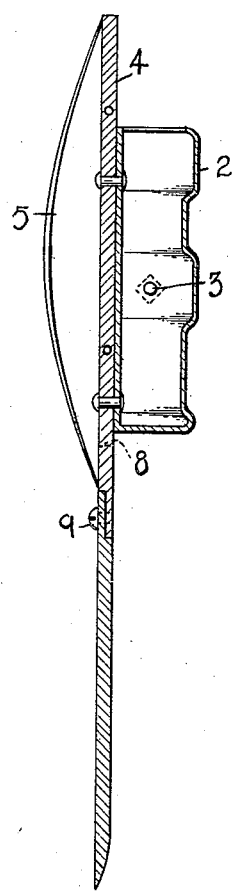
Figure 3:
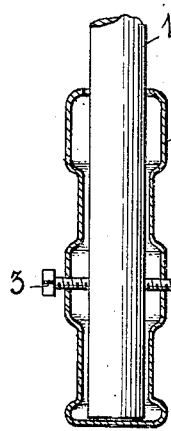
Figure 4:
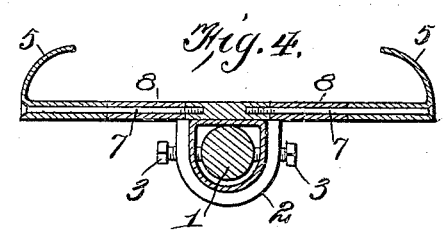

In the accompanying drawings, Figure 1 is a plan view of the shovel constructed in accordance with the invention attached in position to a plow-beam, parts broken away to more advantageously illustrate the invention; Fig. 2 is a central longitudinal section of the shovel; and Fig. 3 is a detail longitudinal section of the shank and a section of a cultivator beam taken on a horizontal plane.

Referring to the drawings for a more particular description of the invention, 1 indicates a standard of suitable form. The shank 2 of the shovel is preferably of elongated tubular form to fit the free end of the standard and is removably secured or attached thereto by set screws 3 working through the shank preferably at points diametrically opposite and against the standard. A shovel plate 4 of preferably rectangular form having its side edges turned or bent inwardly to form inwardly-extending side flanges 5 is riveted or otherwise secured to said shank. Said plate is also provided with two longitudinally disposed parallel slots or openings 6 which preferably extend from its outer end to within a suitable distance of its inner or opposite end and arranged in these slots or openings and removably secured in position therein by horizontal fastening screws 7 working through the side edges of the plates 4 are corresponding plates 8. When the cultivator is to be used for rough work, these plates 8 are removed to disclose said openings 6, for weeds, rocks or other such matter to pass through. A cultivator point of suitable form or construction is removably secured by screws 9 or other equivalent means to the upper face and outer end of said plate 4 so that it may be removed should it become unfit for use through wear, breakage or the like and a new point substituted in its stead.

From the foregoing description taken in connection with the accompanying drawings, the construction and operation of the invention will be readily understood without requiring a more extended explanation.

I claim as my invention:—

1. In a cultivator shovel, the combination of an elongated rectangular shovel plate having side flanges and a plurality of longitudinally disposed parallel slots or openings extending from one end to near its opposite end, plate members removably positioned in said openings and a cultivator point removably attached to the plate with means for removably attaching the shovel plate to a cultivator standard.

2. In a cultivator shovel, the combination with a hollow elongated shank adapted for removable attachment to a cultivator beam, of a plate having side flanges and two longitudinally disposed parallel openings, plates removably positioned in said openings and a cultivator shovel removably attached to one end of said plate.

3. A cultivator shovel, embracing an elongated shovel member formed with a plurality of longitudinally disposed parallel slots or openings, blade members removably fitted in said slots or openings and means for attaching the shovel member to a cultivator standard.

4. A cultivator shovel, embracing an elongated shovel member formed with a plurality of longitudinally disposed parallel slots or openings, plate members adapted to fit in said slots or openings, fastening screws screwing through the side edges of the shovel member and into the plate members for removably securing the latter in position with means for attaching the shovel member to a plow standard.

In testimony whereof I have hereunto set my hand in presence of two subscribing witnesses.

PETER PRIESS.

Witnesses:
    JAMES HEPBURN,
    HOMER B. ADAMS.